(12) United States Patent
Abd Elhamid et al.

(10) Patent No.: US 9,995,260 B2
(45) Date of Patent: Jun. 12, 2018

(54) BI-FUEL VEHICLE

(71) Applicant: GM GLOBAL TECHNOLOGY OPERATIONS LLC, Detroit, MI (US)

(72) Inventors: Mahmoud H. Abd Elhamid, Troy, MI (US); Anne M. Dailly, West Bloomfield, MI (US); Mei Cai, Bloomfield Hills, MI (US); Herman K. Phlegm, West Bloomfield, MI (US); Ronald O. Grover, Jr., Northville, MI (US); Kushal Narayanaswamy, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 163 days.

(21) Appl. No.: 14/845,339

(22) Filed: Sep. 4, 2015

(65) Prior Publication Data

US 2017/0067425 A1 Mar. 9, 2017

(51) Int. Cl.
*F01B 29/04* (2006.01)
*F02M 37/00* (2006.01)
(Continued)

(52) U.S. Cl.
CPC ......... *F02M 37/0088* (2013.01); *F02B 11/02* (2013.01); *F02B 43/00* (2013.01); *Y02T 10/32* (2013.01)

(58) Field of Classification Search
CPC ............. F02M 37/0088; F02M 37/082; F02M 21/0218; F02M 21/0221; F02M 25/01;
(Continued)

(56) References Cited

U.S. PATENT DOCUMENTS 3,001,376 A   9/1961   Webster
5,658,013 A * 8/1997   Bees ...................... B60K 15/03
                                                            280/831

(Continued)

FOREIGN PATENT DOCUMENTS

CN       106494220 A    3/2017
DE     102016115472 A1  3/2017
WO     WO 2013/130401   9/2013

OTHER PUBLICATIONS

"OPW 11A and 11B Automatic Nozzles", OPW, pp. 144-145.
(Continued)

*Primary Examiner* — Mark Laurenzi
*Assistant Examiner* — Jason Sheppard
(74) *Attorney, Agent, or Firm* — Harness, Dickey & Pierce, P.L.C.

(57) ABSTRACT

A bi-fuel vehicle has an Internal Combustion Engine (ICE) to provide motive power to the vehicle by combustion of a liquid fuel and gas-phase fuel. The vehicle has a dual fuel tank including a liquid fuel tank to receive liquid fuel, contain the liquid fuel, and supply the liquid fuel for combustion in the ICE. The vehicle has a pressurizable gas-phase fuel tank defined by a wall. A gas-phase fuel is permeable through the wall. The pressurizable gas-phase fuel tank is to receive the gas-phase fuel, contain the gas-phase fuel, and supply the gas-phase fuel for combustion in the ICE. A shell envelops the pressurizable gas-phase fuel tank and defines an interior space of the liquid fuel tank. The wall is in fluid communication with the interior space. The interior space is to receive the permeated gas-phase fuel.

17 Claims, 8 Drawing Sheets

(51) Int. Cl.
*F02B 11/02* (2006.01)
*F02B 43/00* (2006.01)

(58) Field of Classification Search
CPC ......... F02M 25/14; F02B 11/02; F02B 43/00; F02B 2043/103; B60K 2015/03105; F23J 15/04; F22D 1/003; F02D 19/12
See application file for complete search history.

(56) References Cited

U.S. PATENT DOCUMENTS

| | | |
|---|---|---|
| 5,884,810 A | 3/1999 | Reddy |
| 6,223,526 B1 * | 5/2001 | Wissler ................. B60K 15/03 220/23.87 |
| 6,612,458 B2 | 9/2003 | Balzer et al. |
| 8,342,283 B2 | 1/2013 | Rolfe et al. |
| 2014/0278001 A1 | 9/2014 | Miller et al. |

OTHER PUBLICATIONS

Adewole,J.K.,et al.,"Dev. of a Mathematical Model for Natural Gas Permeation Through Polymer Nanocomposites at High Pressure and Temp.", Jrnl of Nano Res.,vol. 21,2013,pp. 95-101.
"Gasoline Dispenser Nozzle Spouts", J285, Surface Vehicle Recommended Practice, SAE International, Jan. 1999, 4 pages.
"Recommended Practice for Compressed Natural Gas Vehicle Fuel", J1616, Surface Vehicle Recommended Practice, SAE International, Feb. 1994, 18 pages.
"Automotive Gasolines", J312, Surface Vehicle Recommended Practice, SAE International, Feb. 2001, 40 pages.
"Diesel Fuels", J313, Surface Vehicle Standard, SAE International, Jul. 2004, 46 pages.

* cited by examiner

BI-FUEL VEHICLE

BACKGROUND

Some internal combustion engines (ICEs) are designed to operate on a particular fuel. For example, an ICE may be designed to operate on regular unleaded gasoline with an Octane Rating of 87, or diesel grade 1-D. ICEs in flex fuel vehicles run on gasoline or gasoline-ethanol blends of up to 85% ethanol (E85).

Multi-fuel engines are capable of operating on multiple fuel types. For example, bi-fuel engines are capable of operating on two different fuel types. One fuel type may be a liquid phase fuel including gasoline, ethanol, bio-diesel, diesel fuel or combinations thereof that are delivered to the bi-fuel engine substantially in a liquid state. The other fuel type may include an alternative fuel, e.g., Compressed Natural Gas (CNG), Liquefied Petroleum Gas (LPG), hydrogen, etc. The two different fuels are stored in separate tanks, and the bi-fuel engine may run on one fuel at a time, or may alternatively run on a combination of the two different fuel types.

SUMMARY

A bi-fuel vehicle has an Internal Combustion Engine (ICE) to provide motive power to the vehicle by combustion of a liquid fuel and gas-phase fuel. The vehicle has a dual fuel tank including a liquid fuel tank to receive liquid fuel, contain the liquid fuel, and supply the liquid fuel for combustion in the ICE. The vehicle has a pressurizable gas-phase fuel tank defined by a wall. A gas-phase fuel is permeable through the wall. The pressurizable gas-phase fuel tank is to receive the gas-phase fuel, contain the gas-phase fuel, and supply the gas-phase fuel for combustion in the ICE. A shell envelops the pressurizable gas-phase fuel tank and defines an interior space of the liquid fuel tank. The wall is in fluid communication with the interior space. The interior space is to receive the permeated gas-phase fuel.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
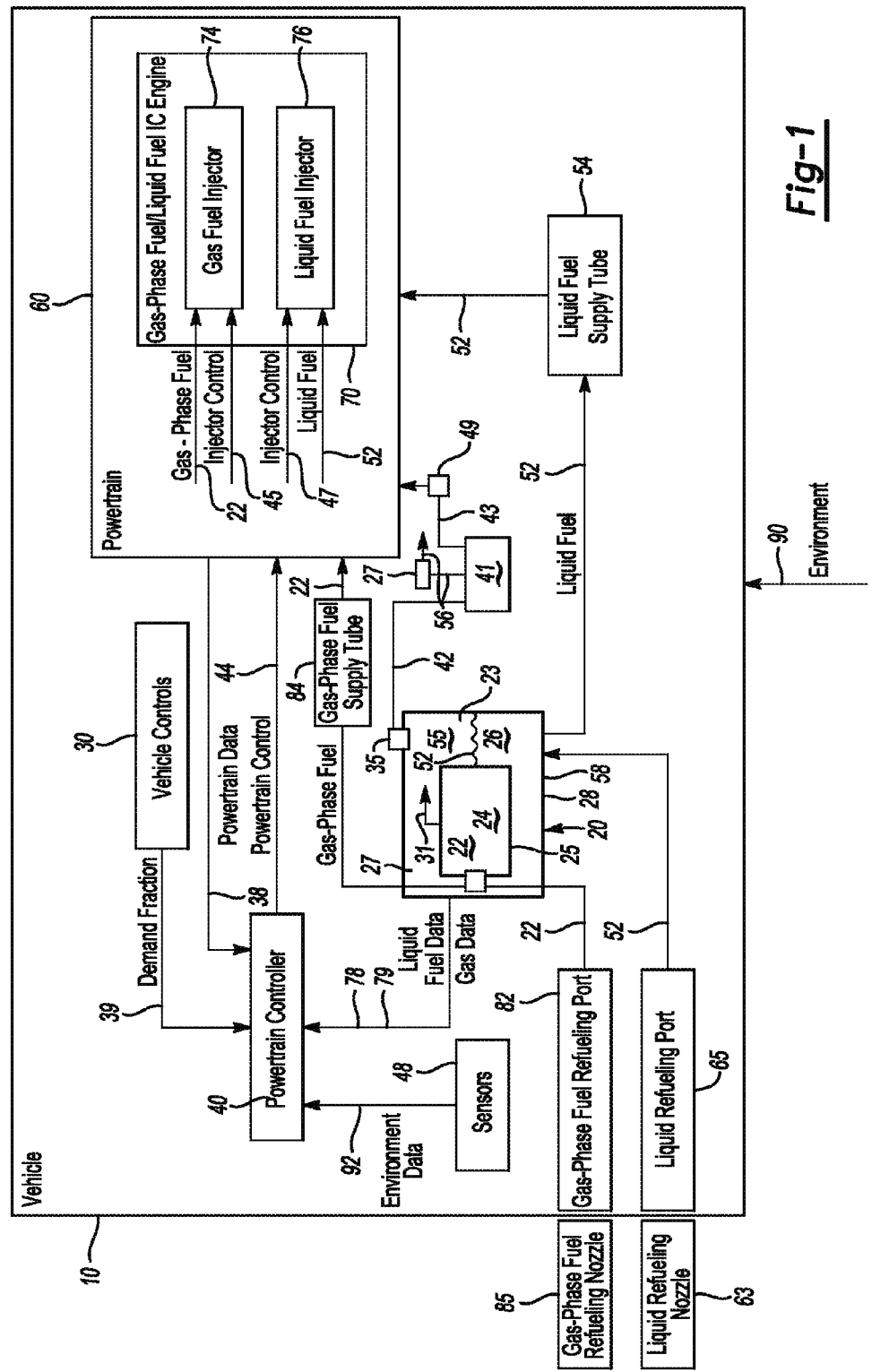
FIG. 1 is a system block diagram depicting an example of a vehicle according to the present disclosure.

Internal combustion engines (ICEs) combust fuel inside an engine to perform work. Some ICEs are used in vehicles to provide motive power to the vehicles. As used herein, vehicle means a self-propelled mobile machine that transports passengers or cargo. Examples of vehicles according to the present disclosure are: motor vehicles (motorcycles, cars, trucks, buses, trains), and surface watercraft (ships, boats).

In some cases, ICEs are defined by the type of fuel that the ICEs are designed to consume. For example, some diesel engines may run on diesel grade 1-D, or diesel grade 2-D. Gasoline engines may typically run on gasoline. Bi-fuel engines may be compatible with two types of fuel, for example, gasoline and natural gas. Flex-fuel vehicles (FFVs) may run on a range of combinations of gasoline and ethanol.

In examples of the present disclosure, a natural gas solute may be dissolved in a liquid fuel solvent. The solution of the natural gas solute in the liquid fuel solvent has more energy per volume than the liquid solvent fuel alone. For example, the energy available in a gallon of gasoline may be increased by dissolving natural gas in the gasoline. The solution of natural gas and gasoline does not increase the volume of the gasoline substantially; however, the energy density of the solution is greater than the energy density of the gasoline.

Some existing bi-fuel vehicles have a tank for storing gas-phase fuel and a separate tank for storing liquid fuel. In sharp contrast, examples of the bi-fuel vehicle of the present disclosure store the gas-phase fuel and the liquid fuel in the same dual fuel tank. A pressurizable gas-phase fuel tank is entirely within the liquid fuel tank. A small amount of the gas-phase fuel may permeate through the wall of the pressurizable gas-phase fuel tank into an interior space of the liquid fuel tank. The ullage space may be vented by a liquid discriminating vent valve to maintain a relatively low pressure in the ullage space.

As used herein, permeation means the penetration of a permeant (such as the gas-phase fuel) through a solid (for example, the wall) that has no holes. The process of permeation includes diffusion through the solid and may involve phenomena such as adsorption, dissociation, migration and desorption. Permeation is directly related to the concentration gradient of the permeant, the solid's intrinsic permeability, and the mass diffusivity of the permeant and the solid.

Permeation is different from leakage. Leakage obeys the dynamic gas laws. This means that light gases will penetrate a leak at a higher rate than a heavier gas. The amount of gas passing through a leak will then be governed by the conductance of the leak and the molecular weight of the gas.

The dynamic gas laws apply to any leak mechanism, from pinholes to long labyrinthine passages. A leak is free passage through the solid via a channel or orifice. Permeation, on the other hand, is a process including sorption on the internal surface, diffusion through the solid, and resorption on the external surface before the permeant can desorb into the space on the opposite side of the solid.

A permeable solid is not the same as a porous solid. A porous solid may have cracks, gaps, and spaces or holes in the solid to provide a conduit for leakage. A common experience of permeation occurs with a latex balloon filled with helium. Even though the balloon has no holes or leaks, a latex balloon may, due to permeation, lose most of the helium contained in the balloon within a day or two.

Permeation is, in part, from the diffusion of the permeant molecules, through a membrane or interface. Permeation is related to diffusion. The permeant moves from high concentration to low concentration across the interface. A material with permeability to certain materials and no permeability to other materials is referred to as semipermeable. Only molecules or ions with certain properties will be able to diffuse across through a semipermeable material. Permeation can occur through most materials including metals, ceramics and polymers. However, the permeability of metals is much lower than that of ceramics and polymers due to the crystal structures of the metals.

Permeability depends on the temperature of the interaction as well as the characteristics of both the solid and the permeant component. Through the process of sorption, molecules of the permeant can be either absorbed or adsorbed at the interface.

In examples of the present disclosure, the gas-phase fuel may permeate through the wall of the pressurizable gas-phase fuel tank into the interior space. The ullage space may be vented by the liquid discriminating vent valve to maintain a relatively low pressure in the ullage space. Permeation is directly related to a pressure difference across a permeable membrane. In examples with the pressure in the ullage space kept relatively low, permeation losses from the dual fuel tank are low. In examples, the pressure in the ullage space may be kept less than 10 inches of water gage pressure relative to the atmospheric pressure around the vehicle.

In examples of the present disclosure, the bi-fuel vehicle may have an emission of hydrocarbon less than about 2 grams when tested in accordance with a diurnal plus hot soak test procedure based on the Sealed Housing for Evaporative Determination (SHED) as set forth in Title 40, Code of Federal Regulations, sections 86.130-78 through 86.143-90 as they existed Jul. 1, 1989. In an example of the present disclosure, the portion of the emission of hydrocarbon contributed by the dual fuel tank may be less than about 0.01 grams.

A portion of the permeated gas-phase fuel is dissolved, or absorbed, in the liquid fuel stored in the liquid fuel tank of the dual fuel tank. The amount of gas-phase fuel stored in the liquid fuel depends on the temperature of the solution and the pressure in the ullage space. Another way that the permeated gas-phase fuel is stored in the liquid fuel tank is as a gas in the ullage space. It is to be understood that none of the fuels disclosed herein are in a supercritical state in the pressurizable tank. Therefore, the gas will rise above a surface of the liquid in the liquid fuel tank. As used herein, the ullage space is the volume in the pressurizable tank that is not occupied by the liquid. Also as used herein, the ullage space increases in volume as the volume of the liquid in the pressurizable tank decreases. The gas-phase fuel in the ullage space will reach an equilibrium pressure equal to the vapor pressure of the gas-phase fuel dissolved in the solution. Since the gas-phase fuel may be a mixture of constituent gases, each of the constituent gases will tend toward an equilibrium partial pressure equal to the partial vapor pressure of the constituent dissolved in the solution. As used herein, the partial pressure of the gas-phase fuel means the sum of the partial pressures of each of the constituent gases in the gas-phase fuel. It is to be understood that the liquid fuel may also have volatile components with vapor pressures. The total pressure in the ullage space of the liquid fuel tank is the sum of the partial pressures of all of the gases in the ullage space.

ASTM International, known until 2001 as the American Society for Testing and Materials (ASTM), is an international standards organization that develops and publishes voluntary consensus technical standards for a wide range of materials, products, systems, and services. One method of measuring vapor pressure is by the test method ASTM-D-323, which determines Reid Vapor Pressure (RVP). RVP is a measure of the volatility of volatile crude oil and volatile nonviscous petroleum liquids, except liquefied petroleum gases. It is defined as the absolute vapor pressure exerted by a liquid at 100° F. (37.8° C.) as determined by the test method ASTM-D-323.

It is to be understood that the liquid fuel in examples of the present disclosure is not limited to petroleum liquid fuel. The liquid fuel may include, for example, biodiesel or bio-ethanol or other alcohols. Although ethanol may be produced from petroleum (by hydrolysis of ethylene), most ethanol is produced from agricultural products. As such, ethanol may be a petroleum liquid fuel or a non-petroleum liquid fuel. Biodiesel is produced from agricultural products. Petroleum liquid fuels include gasoline, kerosene, diesel fuel and other similar liquid fuels.

SAE International, initially established as the Society of Automotive Engineers (SAE), is a U.S.-based, globally active professional association and standards organization for engineering professionals in various industries.

According to SAE Surface Vehicle Standard J313, Diesel Fuels, Jul. 28, 2008, automotive and railroad diesel fuels, in general, are derived from petroleum refinery products which are commonly referred to as middle distillates. Middle distillates represent products which have a higher boiling range than gasoline and are obtained from fractional distillation of the crude oil or from streams from other refining processes. Finished diesel fuels represent blends of middle distillates. The properties of commercial distillate diesel fuels depend on the refinery practices employed and the nature of the crude oils from which they are derived. Thus, they may differ both with and within the region in which they are manufactured. Such fuels generally boil over a range between 163° C. and 371° C. (325° F. to 700° F.). Their makeup can represent various combinations of volatility, ignition quality, viscosity, sulfur level, gravity, and other characteristics. Additives may be used to impart special properties to the finished diesel fuel.

ASTM D 975 includes five grades of diesel fuel: Grade No. 1-D; Grade Low Sulfur No. 1-D; Grade No. 2-D; Grade Low Sulfur No. 2-D; and Grade 4-D.

SAE Surface Vehicle Recommended Practice J312, Automotive Gasolines, Feb. 1, 2001, summarizes the composition of automotive gasolines, the significance of their physical and chemical characteristics, and the pertinent test methods for defining or evaluating these properties.

As used herein, liquid fuels are fuels that are generally in a liquid phase at standard ambient temperature 25° C. and pressure (100 kPa absolute). It is to be understood that even though liquid fuels are generally in the liquid phase, the liquid fuels may be volatile, and may completely evaporate if left in an open container for a certain amount of time. As used herein, liquid fuels have boiling points that are higher than 25° C. It is to be understood that some liquid fuels are blends of a plurality of component liquid fuels. In examples of the present disclosure, the liquid fuel may include a petroleum liquid fuel, a biodiesel, an alcohol, or combinations thereof.

As used herein, gas-phase fuels are fuels that are generally in a gas phase at standard ambient temperature 25° C. and pressure (100 kPa absolute). Natural gas, methane, propane, and hydrogen are examples of gas-phase fuels. In an example of the present disclosure, the gas-phase fuel 22 is a natural gas. SAE Surface Vehicle Recommended Practice J1616, Recommended Practice for Compressed Natural Gas Vehicle Fuel, Issued February 1994, describes natural gas as follows: Natural gas is comprised chiefly of methane (generally 88 to 96 mole percent) with the balance being a decreasing proportion of non-methane alkanes (i.e., ethane, propane, butanes, etc.). Other components found in natural gas are nitrogen ($N_2$), carbon dioxide ($CO_2$), water, oxygen, and trace amounts of lubricating oil (from compressors) and sulfur found as hydrogen sulfide ($H_2S$) and other sulfur compounds. Before entering the commercial natural gas transmission system, natural gas is processed to meet limits on hydrogen sulfide, water, condensables of heavier hydrocarbons, inert gases such as $CO_2$ and $N_2$, and energy content. Mercaptan odorants (e.g., tertiary butyl mercaptan) are added by local distribution companies (LDC's) to add a human-detectable odor to natural gas which otherwise would be odorless.

FIG. 1 is a system block diagram depicting an example of a vehicle 10 having a powertrain 60 with an internal combustion engine (ICE) 70 to provide motive power to the vehicle 10 by combustion of a liquid fuel 52 and a gas-phase fuel 22. The vehicle 10 is depicted in an environment 90. The vehicle 10 has sensors 48 that provide environmental data 92 to the powertrain controller 40. Examples of the environmental data 92 include ambient air pressure, temperature, and humidity. The vehicle 10 has a dual fuel tank 20. The dual fuel tank 20 includes a liquid fuel tank 26 to receive liquid fuel 52, contain the liquid fuel 52, and supply the liquid fuel 52 for combustion in the ICE 70. The dual fuel tank 20 includes a pressurizable gas-phase fuel tank 24 defined by a wall 25. The wall 25 may have a polymeric liner layer and a fiber reinforcement layer to support the polymeric liner layer against pressure from the gas-phase fuel 22 in the pressurizable gas-phase fuel tank 24.

A gas-phase fuel 22 is permeable through the wall 25. The pressurizable gas-phase fuel tank 24 is to receive the gas-phase fuel 22, contain the gas-phase fuel 22, and supply the gas-phase fuel 22 for combustion in the ICE 70. A shell 28 envelops the pressurizable gas-phase fuel tank 24 and defines an interior space 27 of the liquid fuel tank 26. The wall 25 is in fluid communication with the interior space 27. The interior space 27 is to receive the permeated gas-phase fuel 31. In other words, the pressurizable gas-phase fuel tank 24 is completely surrounded by the liquid fuel tank 26. Any of the permeated gas-phase fuel 31 that permeates through the wall 25 will be captured by the liquid fuel tank 26.

Gas Data 78 about the gas-phase fuel 22 in the pressurizable gas-phase fuel tank 24 is sent to the powertrain controller 40. Liquid fuel data 79 about the liquid fuel 52 in the liquid fuel tank 26 (for example, fuel level) is sent to the powertrain controller 40. The powertrain 60 sends powertrain data 38 to the powertrain controller 40. Examples of powertrain data 38 include any data from the engine used to control the ICE 70. For example, engine speed and temperature may be powertrain data 38. The powertrain 60 includes the ICE 70. The ICE 70 depicted in FIG. 1 has a liquid fuel injector 76 in fluid communication with the liquid fuel supply tube 54 and a combustion chamber of the ICE 70 to selectably inject a predetermined quantity of the liquid fuel 52 into a combustion chamber or an intake manifold for combustion in the ICE 70. The ICE 70 depicted in FIG. 1 also has a gas-phase fuel injector 74 in fluid communication with the gas-phase fuel supply tube 84 and a combustion chamber of the ICE 70 to selectably inject a predetermined quantity of the gas-phase fuel 22 into a combustion chamber or an intake manifold for combustion in the ICE 70. In examples of the present disclosure, the gas-phase fuel injector 74 and the liquid fuel injector 76 may be combined into an injector that has the capability of injecting both the gas-phase fuel 22 and the liquid fuel 52.

The liquid fuel injector 76 is to selectably inject a predetermined quantity of the liquid fuel 52 or a predetermined quantity of the gas-phase fuel 22 into the ICE 70 for combustion in the ICE 70. The gas-phase fuel injector 74 is to selectably inject a predetermined quantity of the gas-phase fuel 22 into the ICE 70 for combustion in the ICE 70. The powertrain controller 40 sends the powertrain control 44 to inject the liquid fuel 52, or the gas-phase fuel 22, into the ICE 70 at a predetermined rate. The powertrain control 44 includes the injector control 45 to control the gas-phase fuel injector 74; and another injector control 47 to control the liquid fuel injector 76. The vehicle controls 30 provide the demand fraction 39 to the powertrain controller 40.

The ICE 70 may be to combust the liquid fuel 52 and the gas-phase fuel 22 in separate instances of a combustion cycle. In an example, the vehicle 10 may generally use the gas-phase fuel 22 as the primary fuel for the vehicle 10. In the example, the liquid fuel 52 may serve as a reserve fuel to extend the range of the vehicle 10 beyond the range of the vehicle 10 operating on the gas-phase fuel 22. The vehicle 10 may be refueled with gas-phase fuel 22 at relatively low pressure, for example using a natural gas home refueling station up to 50 bar, and have enough range on the gas-phase fuel 22 for typical daily usage (e.g., about 40 miles). In other examples, the vehicle 10 may be refueled with gas-phase fuel 22 at pressures up to about 250 bar. If additional range is required, the liquid fuel 52 may be used to fuel the ICE 70. In another example, the gas-phase fuel 22 and the liquid fuel 52 may be co-injected into the ICE 70 to be consumed together in the same combustion cycle of the ICE 70.

A combustion cycle is a cyclical series of stages of operation of an internal combustion engine. For example, gasoline engines commonly have a four-stroke combustion cycle having an intake, compression, power, and exhaust stroke of a piston repeated every two revolutions of the crankshaft. A two-stroke engine is a type of internal combustion engine which completes a power cycle (combustion cycle) in only one crankshaft revolution and with two strokes of the piston. The timing and location of the fuel injection is to be compatible with the operation of the engine.

The location for injection of the gas-phase fuel 22 and the liquid fuel 52 into the ICE 70 may depend on the type of ICE 70. For example, the gas-phase fuel injector 74 and the liquid fuel injector 76 may each inject their respective fuel into an intake manifold of the ICE 70 if the liquid fuel is gasoline and the ICE 70 has spark ignition. Such an ICE 70 may be capable of running separately on the gas-phase fuel 22, the gasoline, or a combination of both the gas-phase fuel 22 and the gasoline at the same time. The natural gas 22 may be injected in an intake manifold (not shown), or in the intake of a supercharger (not shown) or turbocharger (not shown).

An example of operation of the vehicle 10 depicted in FIG. 1 is as follows: The liquid fuel 52 is delivered from the liquid refueling nozzle 63 into the liquid fuel tank 26 of the dual fuel tank 20. The liquid refueling nozzle 63 may be a conventional liquid fuel dispensing nozzle. (See SAE Surface Vehicle Recommended Practice J285, Gasoline Dispenser Nozzle Spouts, Reaffirmed January 1999.) In an example, if the liquid fuel is unleaded gasoline, a standard SAE fuel dispensing nozzle may be, for example, an OPW 11AP (commercially available from OPW, a Dover Company, Hamilton, Ohio).

Gas-phase fuel 22 may be delivered from the gas-phase fuel refueling nozzle 85 through the gas-phase fuel refueling port 82 to the pressurizable gas-phase fuel tank 24 of the dual fuel tank 20. The pressure may be relatively low, for example, from about 2 bar to about 50 bar. However, in examples of the present disclosure, the pressurizable gas-phase fuel tank 24 is to be pressurizable up to a maximum pressure of about 250 bar. In other examples, the maximum pressure may be lower, for example from about 2 bar to about 200 bar. For example, the maximum pressure may be about 50 bar.

The shell 28 of the dual fuel tank 20 may include a permeation barrier layer. In examples, the permeation barrier layer may be a polymer. In an example, the permeation barrier layer may be fluoropolymer. In other examples, the permeation barrier layer may be metallic. For example, a thin layer (on the order of about 1 micrometer thick) of aluminum may be deposited on a shell substrate by a physical vapor deposition process. Another polymer layer may be applied to prevent chemical interaction between the aluminum and the gas-phase fuel 22 or liquid fuel 52.

Over a period of time, a relatively small amount of gas-phase fuel 22 may permeate through the wall 25 and accumulate in the interior space 27. In an example, the permeated gas-phase fuel 31 may accumulate in the ullage space 23 where the permeated gas-phase fuel 31 will mix with the evaporated vapor from the liquid fuel 52 to form a gaseous mixture 55 in the ullage space 23. The pressure in the ullage space 23 will be the sum of the partial pressure of the permeated gas-phase fuel 31 and the partial pressure of the vapor from the liquid fuel 52 plus the partial pressure from any other gases that may be present in the tank (for example, air or water vapor).

Powering the ICE 70 may cause the gas-phase fuel 22 to be substantially depleted from the pressurizable gas-phase fuel tank 24; however, some liquid fuel 52 may remain in the liquid fuel tank 26. The ICE 70 may be capable of continuing to run on the liquid fuel 52 until the liquid level is empty.

For a given temperature, a higher permeated gas-phase fuel partial pressure in the ullage space 23 will cause more of the permeated gas-phase fuel 31 to dissolve in the liquid fuel 52. As such, the liquid fuel 52 may be fortified with permeated gas-phase fuel 31 dissolved therein. In examples described below, the gas-phase fuel 22 may be introduced into the liquid fuel tank 26 to pressurize the liquid fuel tank 26. Liquid fuel 52 fortified with the gas-phase fuel 22 or permeated gas-phase fuel 31 will provide more vehicle range per gallon of the liquid fuel 52 compared to the liquid fuel 52 without the gas-phase fuel 22 dissolved therein.

The vehicle 10 may be refueled with gas-phase fuel 22 at any time via the gas-phase fuel refueling port 82.

Figure 2:
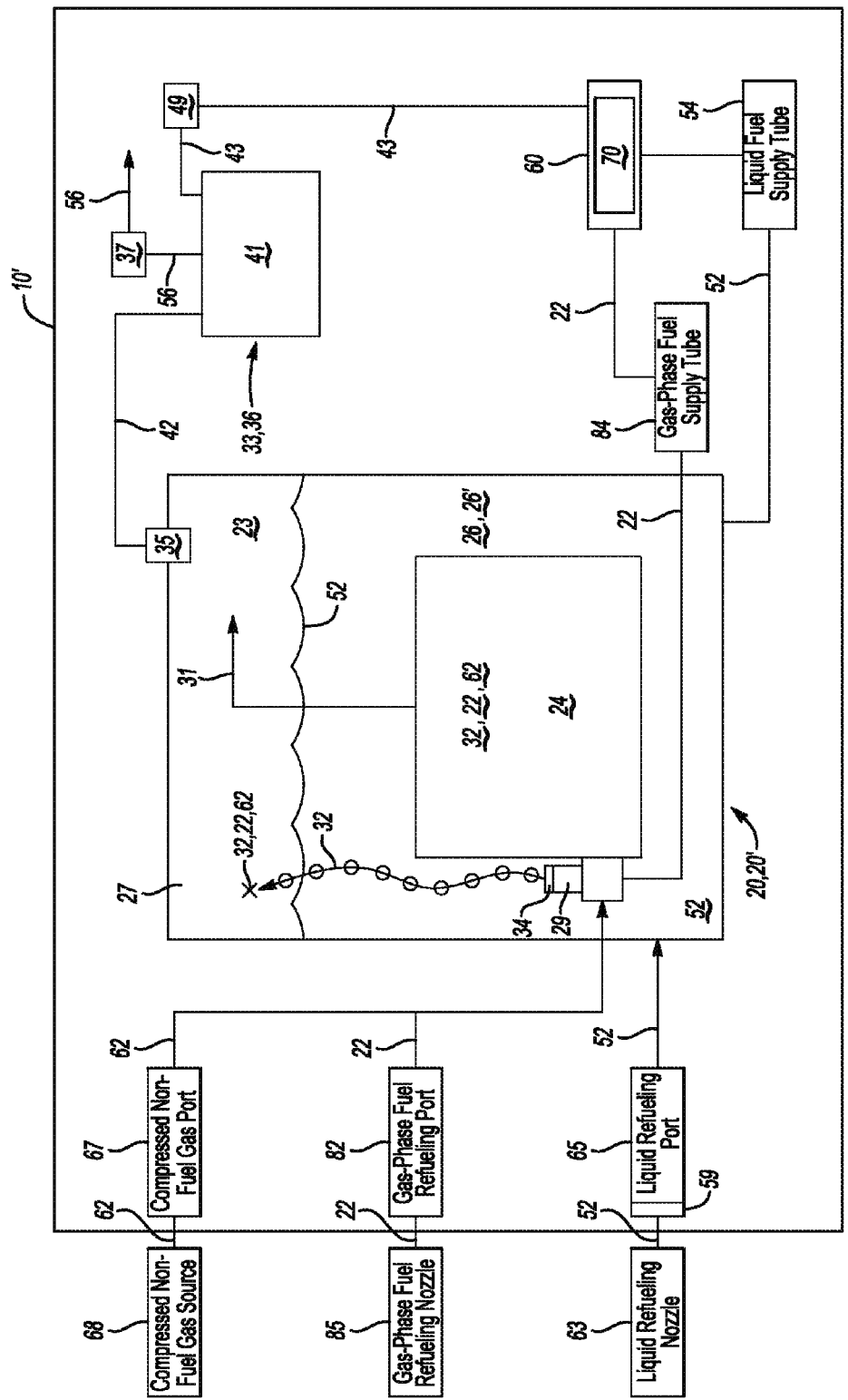
FIG. 2 is a system block diagram depicting an example of the present disclosure with a dual fuel tank having a liquid fuel tank that is a pressurizable liquid fuel tank.

Referring to FIG. 2, the dual fuel tank 20' further includes a pressure regulator 29 to pressurize the interior space 27 of the pressurizable liquid fuel tank 26' to a liquid fuel delivery pressure with a compressed gas 32 from the pressurizable gas-phase fuel tank 24. The compressed gas 32 in the interior space 27 of the pressurizable liquid fuel tank 26' is to propel the liquid fuel 52 to the ICE 70 for combustion. Since the compressed gas propels the liquid fuel 52 to the ICE 70, the dual fuel tank 20' may deliver the liquid fuel 52 without an electric fuel pump as found in some existing liquid fuel tanks for vehicles. A cost savings may be realized by eliminating the electric fuel pump.

A liquid refueling port 65 is in fluid communication with the liquid fuel tank 26, 26' of the dual fuel tank 20, 20' to selectably interface with a liquid refueling nozzle 63 to receive the liquid fuel 52 from the liquid refueling nozzle 63.

A gas-phase fuel refueling port 82 is in fluid communication with the pressurizable gas-phase fuel tank 24 to selectably interface with a gas-phase fuel refueling nozzle 85 to receive the gas-phase fuel 22 from the gas-phase fuel refueling nozzle 85. A gas-phase fuel supply tube 84 is to convey the gas-phase fuel 22 from the pressurizable gas-phase fuel tank 24 in the dual fuel tank 20, 20' to the ICE 70. A liquid fuel supply tube 54 is to convey the liquid fuel 52 from the liquid fuel tank 26, 26' of the dual fuel tank 20, 20' to the ICE 70.

In examples of the present disclosure, the bi-fuel vehicle 10' with the pressurizable liquid fuel tank 26' may have a liquid refueling mode to allow the liquid fuel 52 to be added to the pressurizable liquid fuel tank 26' at any time that the pressurizable liquid fuel tank 26' is not full (i.e. to the maximum liquid fuel level), and the pressure in the pressurizable liquid fuel tank 26' is low enough to allow the liquid fuel 52 to be added to the pressurizable liquid fuel tank 26'. In the liquid refueling mode, pressure in the ullage portion 23 of the pressurizable liquid fuel tank 26' is vented before the filler pipe cap 59 is removed.

In examples of the present disclosure, a liquid discriminating vent valve 35 is to selectably vent the ullage portion 23 of the interior space 27 of the pressurizable liquid fuel tank 26' to a vapor recovery system 33 when the bi-fuel vehicle 10' is in the liquid refueling mode. The liquid discriminating vent valve 35 selectably allows the gas from the ullage portion 23 to be vented to the vapor recovery system 33 while preventing the liquid fuel 52 from flowing or being carried along with the gas flow stream through the liquid discriminating vent valve 35. The liquid discriminating vent valve 35 may have a rollover function to prevent fluid from leaking out of the liquid discriminating vent valve 35 if the dual fuel tank 20' is inverted.

The liquid discriminating vent valve 35 may include, for example, a solenoid activated valve to allow the liquid discriminating vent valve 35 to selectably vent the ullage portion 23 of the interior space 27 of the pressurizable liquid fuel tank 26' to a vapor recovery system 33 when the bi-fuel vehicle 10' is in the liquid refueling mode. The solenoid valve may be a normally closed valve that is caused to open when the solenoid is energized. When the vehicle 10' determines that the liquid refueling mode has been entered, the solenoid may be energized. The liquid discriminating vent valve 35 may have a mechanical override feature to allow the pressurizable liquid fuel tank 26' to be vented if there is insufficient electrical power available to operate the solenoid. A cut-off valve 34 is in fluid communication with the pressurizable gas-phase fuel tank 24 and the pressure regulator 29 to selectably prevent the compressed gas 32 from flowing out of the pressurizable gas-phase fuel tank 24 into the interior space 27 of the pressurizable liquid fuel tank 26' when the bi-fuel vehicle 10' is in the liquid refueling mode.

In examples of the vehicle 10' the compressed gas 32 may be a compressed non-fuel gas 62. Compressed non-fuel gas 62 may be useful in an event that the vehicle 10' is refueled with the liquid fuel 52 and there is insufficient pressure in the pressurizable gas-phase fuel tank 24 to pressurize the interior space 27 of the pressurizable liquid fuel tank 26' to propel the liquid fuel to the ICE 70. If, for example, the vehicle 10' is refueled at a commercial refueling facility that does not have pressurized gas-phase fuel 22 available, compressed gas 32 may be added to the pressurizable gas-phase fuel tank 24 to supply the pressure to propel the liquid fuel 52 to the ICE 70. For example, many commercial fuel stations have air compressors to provide compressed air for pneumatic tires. Such an air compressor may be used to add air as the compressed gas 32 to propel the liquid fuel to the ICE 70.

Examples of the bi-fuel vehicle 10' may include a compressed non-fuel gas port 67 in fluid communication with the pressurizable gas-phase fuel tank 24 to selectably interface with a compressed non-fuel gas source 68 to receive the compressed non-fuel gas 62 from the compressed non-fuel gas source 68. The compressed non-fuel gas 62 may be the compressed gas 32 to pressurize the interior space 27 of the liquid fuel tank 26 to the liquid fuel delivery pressure. In examples, the compressed non-fuel gas 62 may be any non-fuel gas. For example, air, nitrogen, carbon dioxide, and argon are non-fuel gasses that may be used. As used herein, a non-fuel gas would not include, for example, natural gas, propane, or hydrogen.

Vapor evaporated from the liquid fuel 52 may mix with the permeated gas-phase fuel 31, the gas-phase fuel 22, or the non-fuel gas 62 in the ullage space 23. The vapor recovery system 33 may include an onboard refueling vapor recovery (ORVR) system 36.

After the pressurizable liquid fuel tank 26' has been vented into the vapor recovery system 33, unpressurized gas-phase fuel 22 and liquid fuel vapor evaporated from the liquid fuel 52 may remain in the pressurizable liquid fuel tank 26'. The mixture of gases that remain in the pressurizable liquid fuel tank 26' will be displaced by the liquid fuel 52 during liquid refueling. The mixture of gases that is displaced during liquid refueling operations are trapped for recovery in the ORVR system 36. The ORVR system 36 is also referred to herein as a vapor recovery system 33 because it may not be limited to recovery of refueling vapor. For example, the vapor recovery system 33 may capture the permeated gas-phase fuel 31 that is mixed with the vapor from the liquid fuel 52 in the ullage space 23.

In the examples depicted in FIG. 1 and FIG. 2, the fuel vapor is conveyed through vapor conduit 42 which opens into a canister 41 in which is disposed a volume of activated carbon having a fuel vapor adsorbing capacity. The fuel vapor is adsorbed on the activated carbon of the canister 41. Purge conduit 43 is provided between the ICE 70 and the canister 41. Vent conduit 56 is open into the canister 41 on a first end, with a second end opposing the first end exposed to ambient air. The vent conduit 56 may include a normally open vent valve 37 that may be selectively driven to a closed position in accordance with diagnostic or maintenance procedures. Purge valve 49, for example an electronically controlled solenoid valve, is disposed in the purge conduit 43. When the purge valve 49 is electrically driven to an open position, the canister 41 is exposed to vacuum from a running ICE 70, drawing ambient air through the vent conduit 56 to the canister 41, across the activated carbon thereof for drawing fuel vapor with the ambient air from the canister 41 and through the purge conduit 43 into the ICE 70 for combustion therein.

The liquid discriminating vent valve 35 and the vapor recovery system 33 prevent a total gas pressure in the ullage space 23 from exceeding a predetermined maximum ullage space gas pressure except during a liquid refueling shut-off event. In examples of the present disclosure, the predetermined maximum ullage space gas pressure allows the liquid fuel tank 26 to receive the liquid fuel 52 via the liquid refueling port 65 at a predetermined maximum liquid fuel refueling rate. In an example, the maximum liquid fuel refueling rate may be about 15 gallons per minute.

The following example is to illustrate the relationship between liquid fuel refueling rate, gas flow rate through the vapor recovery system 33, and pressure in the ullage space 23. If the liquid discriminating vent valve 35 is too restrictive to gas flow, the total gas pressure in the ullage space 23 may reach the predetermined maximum ullage space gas pressure before the liquid fuel tank 26 has been filled to capacity with liquid fuel 52. The pressure buildup causes the liquid fuel 52 to back up into the filler pipe and causes the liquid refueling nozzle 63 to shut off before the liquid fuel tank 26 has been filled to capacity. During a normal liquid refueling shut-off event, when the liquid fuel 52 in the liquid fuel tank 26 reaches a full level, vapor flow through the liquid discriminating vent valve 35 is shut off (e.g., by a float valve or a solenoid valve), causing the pressure in the tank to rapidly build until the maximum ullage space gas pressure has been reached, causing the liquid fuel 52 to back up into the filler pipe and causing the liquid refueling nozzle 63 to shut off. In an example, the maximum ullage space gas pressure may be from about 10 inches of water to about 15 inches of water, which balances the maximum pressure of fuel standing in the fuel filler pipe.

The ICE 70 is a type of heat engine. Engines convert energy to mechanical work. Heat engines are limited in efficiency by Carnot's theorem, however heat engines are often advantageously applied to perform work because most forms of energy can be converted to heat by processes like exothermic reactions (such as combustion), absorption of light or energetic particles, friction, dissipation and resistance.

An example of a heat engine of the present disclosure is a non-combustion compressed gas expansion engine. An internal combustion engine can be converted to a non-combustion compressed gas expansion engine by manipulating the intake and exhaust valve operations of the ICE. A typical spark ignition ICE may have an intake stroke, a compression stroke, a power stroke, and an exhaust stroke of the piston. In an example of a non-combustion compressed gas expansion engine, the intake and compression strokes are not required. The compressed gas is added to the cylinder and allowed to expand in the power stroke, and the exhaust stroke expels the expanded air from the cylinder.

ICEs combust liquid or gaseous fuels in a process that emits carbon dioxide ($CO_2$), water, and other emission products. About 2.4 kilograms of $CO_2$ is produced for every liter of gasoline consumed in the ICE. An ICE operated in a non-combustion compressed gas expansion mode can power a vehicle at full speed, for example about 70 miles per hour, using air as the working fluid when the air has a pressure of at least about 145 bar. Most losses in fuel economy in an ICE occur during start/stop operation.

In an example of the present disclosure, (see FIG. 5) the pressurizable compressed gas tank 24" contains about 100 L of compressed gas 32. If the compressed gas 32 is air, and the pressure in the pressurizable compressed gas tank 24" is about 250 Bar, roughly 27 kilograms of air is stored inside the pressurizable compressed gas tank 24". Between 145 Bar and 250 Bar, about 10 kilograms of air is stored in the 100 L example of the pressurizable compressed gas tank 24". Assuming wide open throttle conditions are needed for full speed, the vehicle in the example can run pneumatically (i.e. in a non-combustion compressed gas expansion mode) above 145 Bar (with a pressure regulator) for about the same distance that the ICE 70" operating in the internal combustion mode would drive consuming about one gallon of gasoline. The entire operating envelope including stop/start, idle, cruise, acceleration, deceleration and high speed operation is available in the non-combustion compressed gas expansion mode when the pressure in the pressurizable compressed gas tank 24" is above 145 Bar. As the pressure in the pressurizable compressed gas tank 24" falls below 145 Bar, the ICE operated in a non-combustion compressed gas expansion mode will begin to lose some capabilities; for example, the top vehicle speed may begin to drop. However, compressed air at less than 145 Bar can be used to power the vehicle 10''' for a greater distance at less than full speed. If full speed is required and the pressure in the pressurizable compressed gas tank 24" is below about 145 Bar, the ICE may switch to the internal combustion mode.

Figure 3:
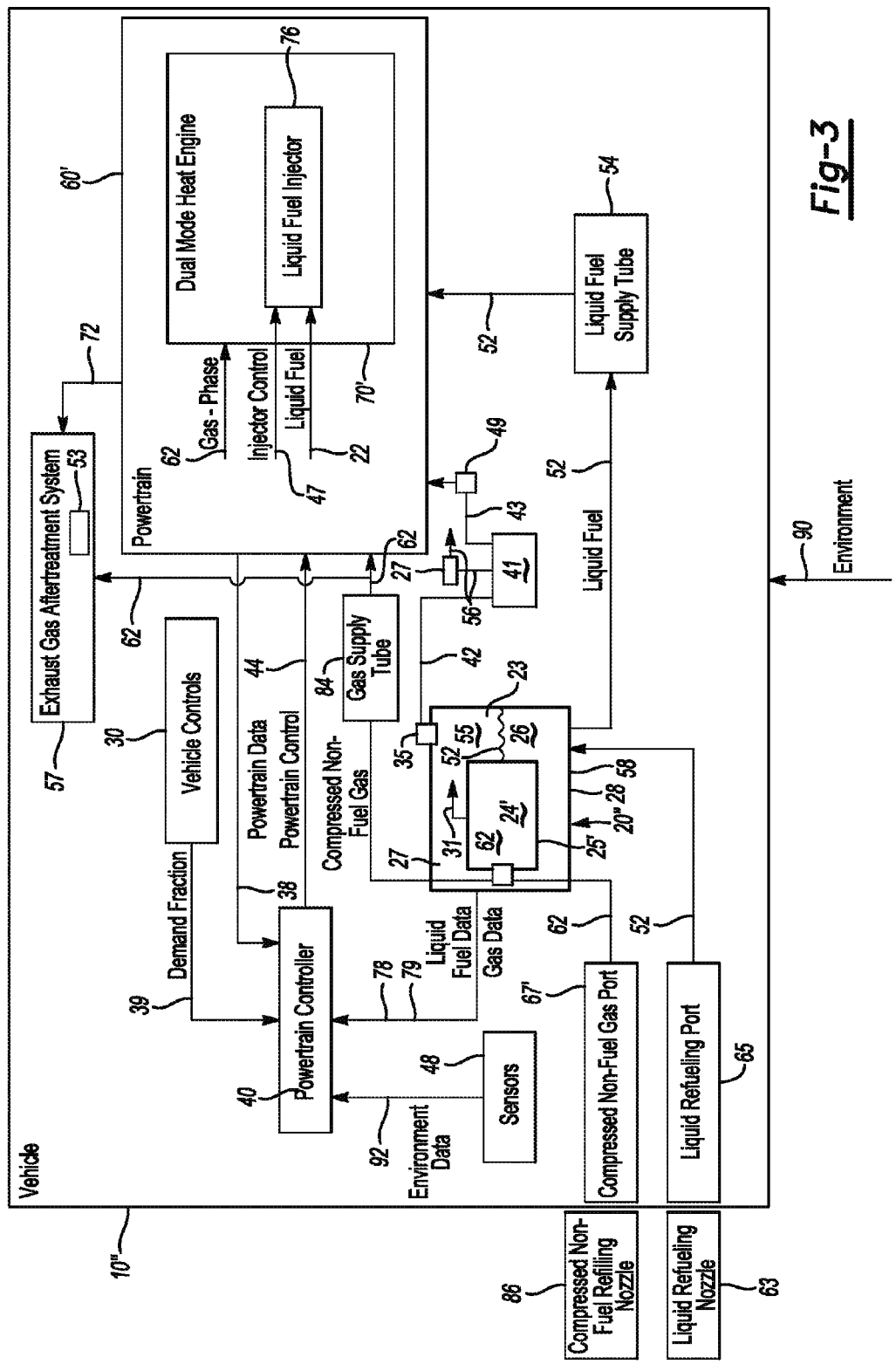
FIG. 3 is a system block diagram depicting an example of the present disclosure with a vehicle powered by a dual mode heat engine.

FIG. 3 depicts an example of a vehicle 10" powered by a dual mode heat engine 70' according to the present disclosure. The dual mode heat engine 70' has an internal combustion operational mode to provide motive power to the vehicle 10" by combustion of a liquid fuel 52. The dual mode heat engine 70' also has a non-combustion compressed gas expansion mode. In the non-combustion compressed gas expansion mode, the dual mode heat engine 70' provides power to the vehicle 10" by non-combustion expansion of a compressed non-fuel gas 62.

The vehicle 10" has a two-state tank 20" including a liquid fuel tank 26 to receive liquid fuel 52, contain the liquid fuel 52, and supply the liquid fuel 52 for combustion in the dual mode heat engine 70'. The two-state tank 20" also has a pressurizable non-fuel compressed gas tank 24' defined by a wall 25'. The pressurizable non-fuel compressed gas tank 24' is to receive the compressed non-fuel gas 62, contain the compressed non-fuel gas 62, and supply the compressed non-fuel gas 62 for powering the dual mode heat engine 70' in the non-combustion compressed gas expansion mode. A shell 28 envelops the pressurizable non-fuel compressed gas tank 24' and defines an interior space 27 of the liquid fuel tank 26. The wall 25' is in fluid communication with the interior space 27. The interior space 27 is to contain the pressurizable non-fuel compressed gas tank 24'.

FIG. 3 depicts exhaust gas 72 from the dual mode heat engine 70' flowing to the exhaust gas aftertreatment system 57. A portion of the compressed non-fuel gas 62 may be conveyed from the pressurizable non-fuel compressed gas tank 24' to the exhaust gas aftertreatment system to be used as a reactant for selective catalytic reduction of oxides of nitrogen (NOx). In another example air may be conveyed from the pressurizable non-fuel compressed gas tank 24' to the exhaust gas aftertreatment system 57 to react the air with unburned hydrocarbon to heat a catalyst to a light-off temperature or for soot regeneration of a particulate filter 53. In an example, the particulate filter 53 is a diesel or gasoline particulate filter. In yet another example, air may be conveyed from the pressurizable non-fuel compressed gas tank 24' to the exhaust gas aftertreatment system 57 to cool a catalyst when the dual mode heat engine 70' is operated at a predetermined percentage of a maximum power of the dual mode heat engine 70'.

Figure 4:
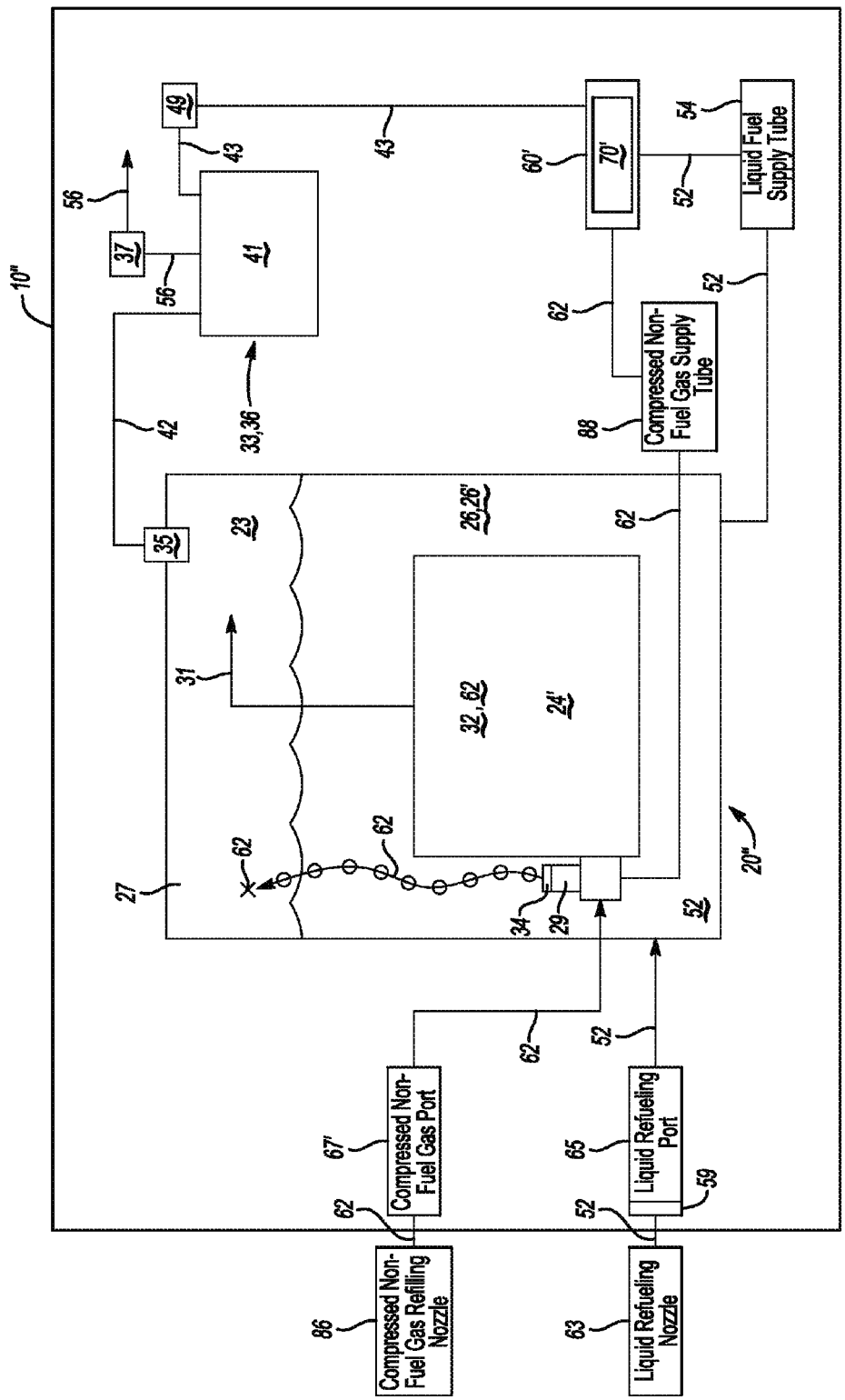
FIG. 4 is a system block diagram depicting an example of the present disclosure with a two-state tank having a pressurizable liquid fuel tank.

As depicted in FIG. 4, in examples of the two-state tank 20", the liquid fuel tank 26 may be a pressurizable liquid fuel tank 26'. The two-state tank 20" may further include a pressure regulator 29 to pressurize the interior space 27 of the pressurizable liquid fuel tank 26' to a liquid fuel delivery pressure with the compressed non-fuel gas 62 from the pressurizable non-fuel compressed gas tank 24'. The compressed non-fuel gas 62 in the interior space 27 of the pressurizable liquid fuel tank 26' is to propel the liquid fuel 52 to the dual mode heat engine 70' for combustion.

In examples of the vehicle 10" of the present disclosure, the dual mode heat engine powered vehicle 10" may have a liquid refueling mode. As shown in the example depicted in FIG. 4, a liquid discriminating vent valve 35 is to selectably vent an ullage portion 23 of the interior space 27 of the liquid fuel tank 26 to a vapor recovery system 33 when the dual mode heat engine powered vehicle 10" is in the liquid refueling mode. A cut-off valve 34 is in fluid communication with the pressurizable non-fuel compressed gas tank 24' and the pressure regulator 29 to selectably prevent the compressed non-fuel gas 62 from flowing out of the pressurizable non-fuel compressed gas tank 24' into the interior space 27 of the liquid fuel tank 26 when the dual mode heat engine powered vehicle 10" is in the liquid refueling mode.

The examples depicted in FIG. 3 and FIG. 4 have a liquid refueling port 65 in fluid communication with the liquid fuel tank 26, 26' to selectably interface with a liquid refueling nozzle 63 to receive the liquid fuel 52 from the liquid refueling nozzle 63. A compressed non-fuel gas port 67' is in fluid communication with the pressurizable non-fuel compressed gas tank 24' to selectably interface with a compressed non-fuel gas refilling nozzle 86 to receive the compressed non-fuel gas 62 from the compressed non-fuel gas refilling nozzle 86. A compressed non-fuel gas supply tube 88 is to convey the compressed non-fuel gas 62 from the pressurizable non-fuel compressed gas tank 24' to the dual mode heat engine 70'. A liquid fuel supply tube 54 is to convey the liquid fuel 52 from the liquid fuel tank 26' to the dual mode heat engine 70'.

Figure 5:
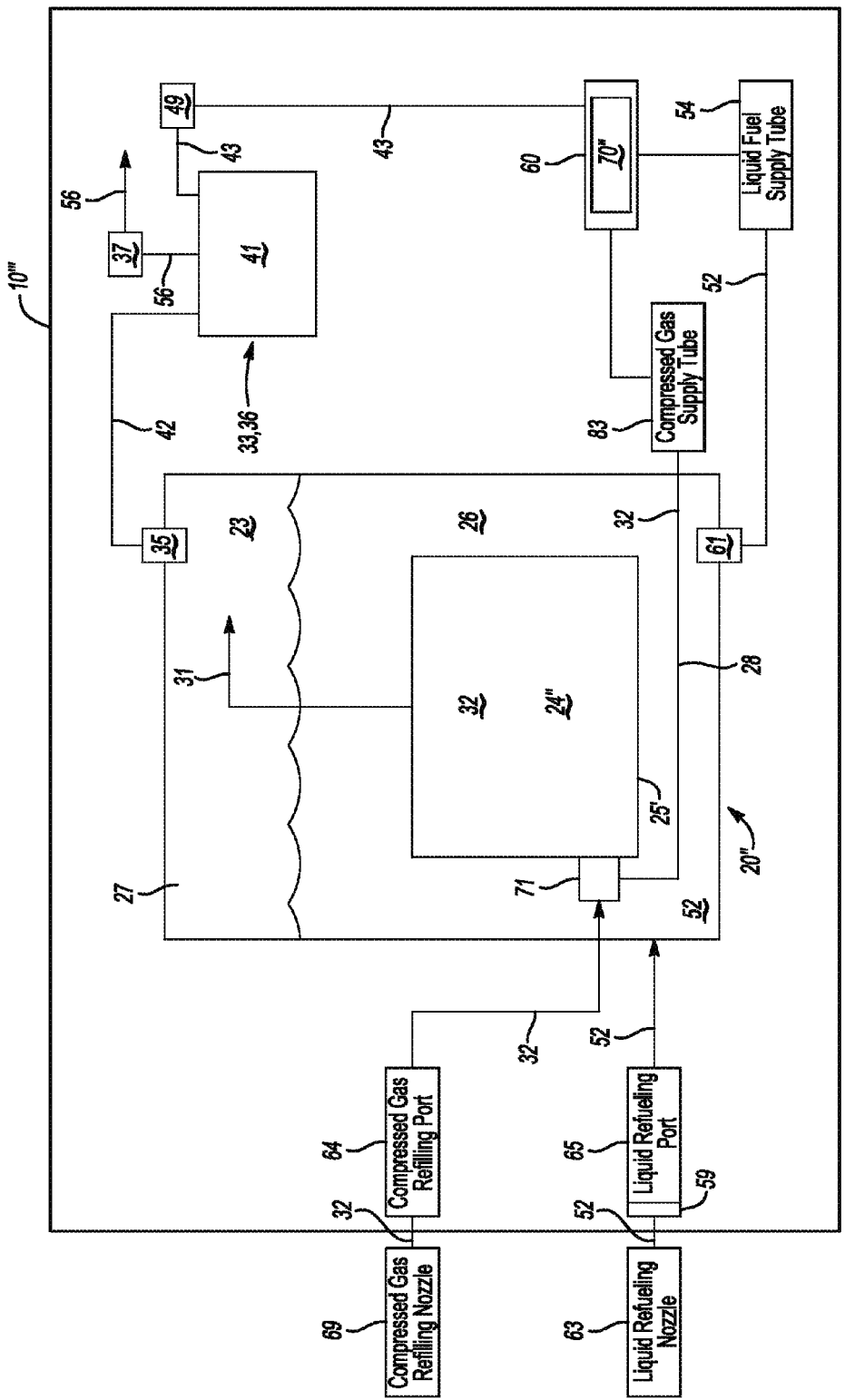
FIG. 5 is a system block diagram depicting an example of the present disclosure with a two-state tank for a heat engine powered vehicle.

FIG. 5 depicts an example of a two-state tank 20" for a heat engine powered vehicle 10'. The two-state tank 20" includes a liquid fuel tank 26 to receive liquid fuel 52, contain the liquid fuel 52, and supply the liquid fuel 52 for combustion in the heat engine 70". A pressurizable compressed gas tank 24" is defined by a wall 25'. The pressurizable compressed gas tank 24" is to receive a compressed gas 32, contain the compressed gas 32, and supply the compressed gas 32 for powering the heat engine 70". The two-state tank 20" includes a shell 28 enveloping the pressurizable compressed gas tank 24" and defining an interior space 27 of the liquid fuel tank 26. The wall 25' is in fluid communication with the interior space 27. The interior space 27 is to contain the pressurizable compressed gas tank 24".

As depicted in FIG. 5, in examples of the present disclosure, the liquid fuel tank 26 is to receive the liquid fuel 52 from a liquid refueling nozzle 63 via a liquid refueling port 65 in fluid communication with the liquid fuel tank 26. The pressurizable compressed gas tank 24" is to receive the compressed gas 32 from a compressed gas refilling nozzle 69 via a compressed gas refilling port 64 in fluid communication with the pressurizable compressed gas tank 24". A compressed gas outlet port 71 is to convey the compressed gas 32 from the pressurizable compressed gas tank 24" to a compressed gas supply tube 83 for conveying the compressed gas 32 to the heat engine 70". A liquid fuel outlet port 61 is to convey the liquid fuel 52 from the liquid fuel tank 26 to a liquid fuel supply tube 54 for conveying the liquid fuel 52 to the heat engine 70" for combustion.

Figure 5A:
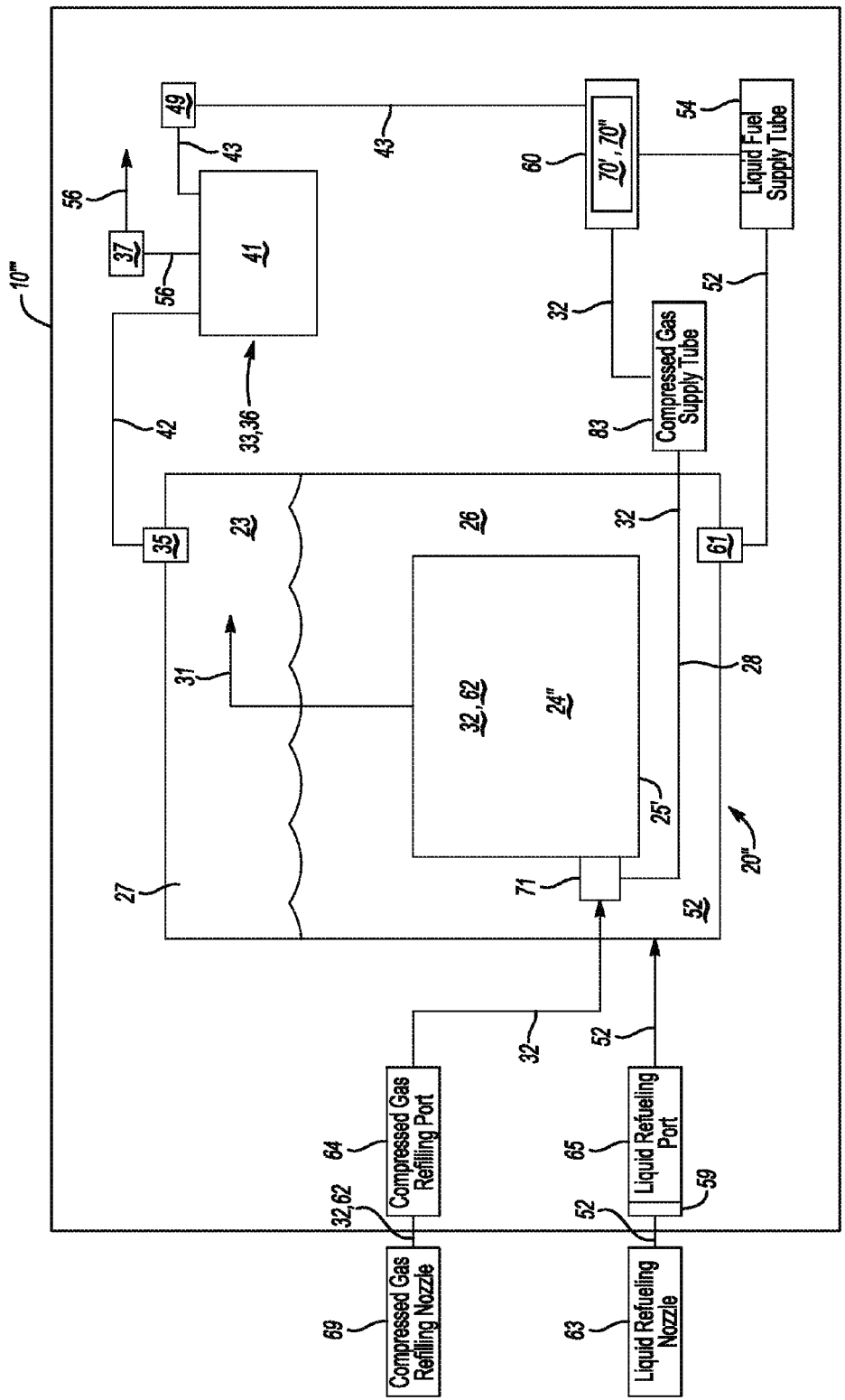
FIG. 5A is a system block diagram depicting an example of the present disclosure with a two-state tank operatively connected to a heat engine that has an internal combustion operational mode and a non-combustion compressed gas expansion mode.

As depicted in FIG. 5A, the two-state tank 20" is operatively connected to a heat engine 70" that has an internal combustion operational mode to provide motive power to the vehicle 10' by combustion of a liquid fuel 52. The heat engine 70" has a non-combustion compressed gas expansion mode in which the heat engine 70" provides power to the vehicle 10' by non-combustion expansion of the compressed gas 32. In the example depicted in FIG. 5A, the compressed gas 32 is a compressed non-fuel gas 62. In the example depicted in FIG. 5A, the heat engine 70" is a dual mode heat engine 70'. In an example, the power provided to the vehicle 10''' by the non-combustion expansion of the compressed gas 32 may be for initiating movement of the vehicle 10''' from a stand-still and continuing to provide motive power up to a predetermined time or distance threshold. Therefore the dual mode heat engine 70' may be used in the non-combustion compressed gas expansion mode for stop and go traffic. It is noted that there is no compression stroke when the dual mode heat engine 70' operates in the non-combustion compressed gas expansion mode, and there is no need to engage an electric starter for stop-start operation.

Figure 6:
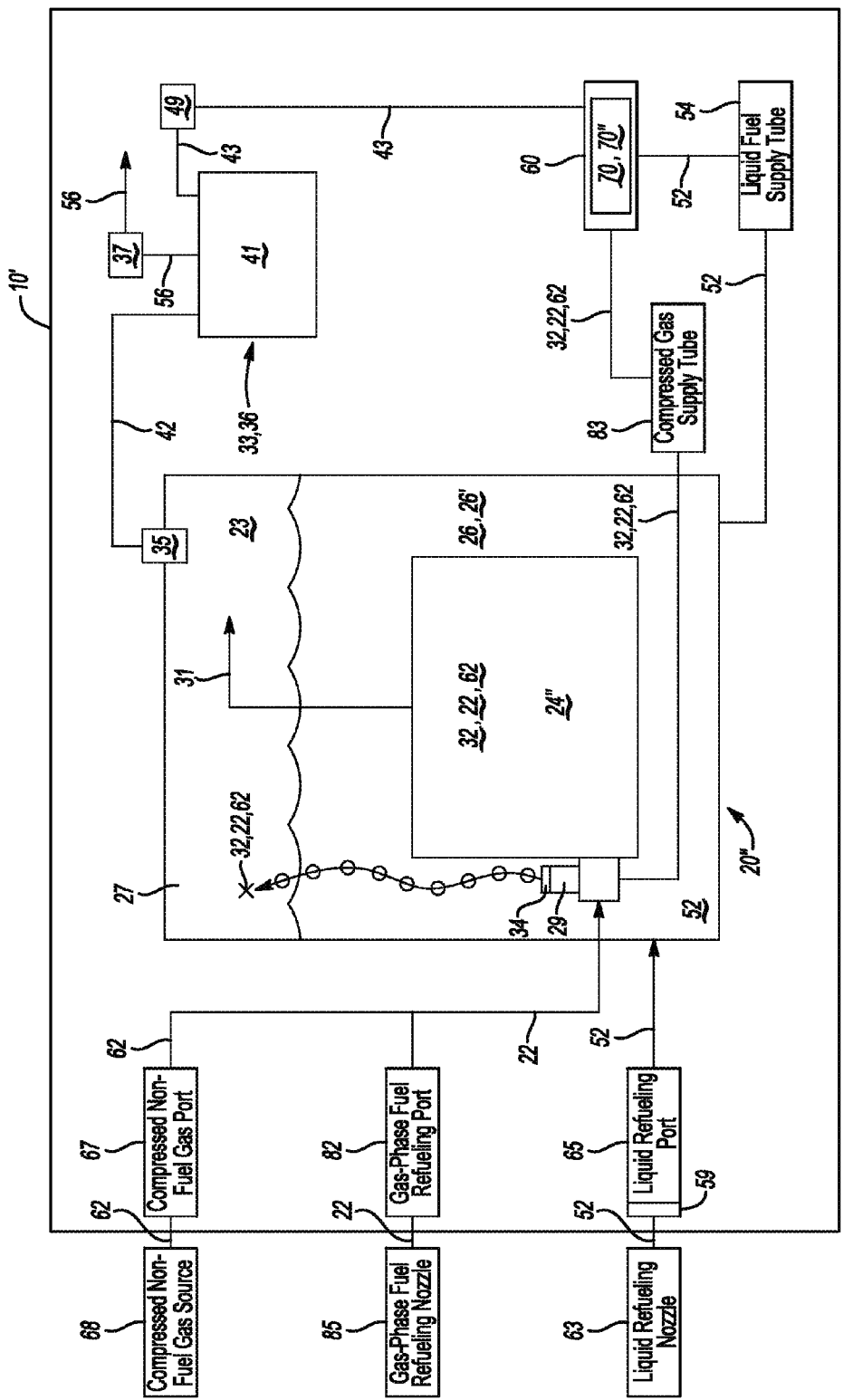
FIG. 6 is a system block diagram depicting an example of the present disclosure with a two-state tank with a pressurizable liquid fuel tank.

FIG. 6 depicts a two-state tank 20" with a pressurizable liquid fuel tank 26' according to the present disclosure. The two-state tank 20" includes a pressure regulator 29 to pressurize the interior space 27 of the pressurizable liquid fuel tank 26' to a liquid fuel delivery pressure with the compressed gas 32 from the pressurizable compressed gas tank 24". The compressed gas 32 in the interior space 27 of the pressurizable liquid fuel tank 26' is to propel the liquid fuel 52 to the heat engine 70" for combustion. In FIG. 6, the compressed gas 32 may be a compressed non-fuel gas 62, a compressed gas-phase fuel 22, or a mixture of compressed non-fuel gas 62 and compressed gas-phase fuel 22. The compressed gas 32 may be a compressed non-fuel gas 62 for a period of time, and a compressed gas-phase fuel 22 for another period of time.

For example, the two-state tank 20" depicted in FIG. 6 may provide liquid fuel 52 and gas-phase fuel 22 to a heat engine 70" that is an ICE 70 to provide motive power to the vehicle 10' by combustion of the liquid fuel 52 and the gas-phase fuel 22. The gas-phase fuel 22 may be the compressed gas 32 for powering the heat engine 70", ICE 70. The two-state tank 20" may include a compressed non-fuel gas port 67 in fluid communication with the pressurizable compressed gas tank 24" to selectably interface with a compressed non-fuel gas source 68 to receive a compressed non-fuel gas 62 from the compressed non-fuel gas source 68. The compressed non-fuel gas 62 may be the compressed gas 32 to pressurize the interior space 27 of the pressurizable liquid fuel tank 26' to the liquid fuel delivery pressure when the ICE 70 is to be powered by the liquid fuel 52.

As depicted in FIG. 6, examples of the two-state tank 20" may have a liquid refueling mode. A liquid discriminating vent valve 35 is to selectably vent an ullage portion 23 of the interior space 27 of the pressurizable liquid fuel tank 26' to a vapor recovery system 33 when the two-state tank 20" is in the liquid refueling mode. A cut-off valve 34 is in fluid communication with the pressurizable compressed gas tank 24" and the pressure regulator 29 to selectably prevent the compressed gas 32 from flowing out of the pressurizable compressed gas tank 24" into the interior space 27 of the pressurizable liquid fuel tank 26' when the two-state tank 20" is in the liquid refueling mode.

Figure 7:
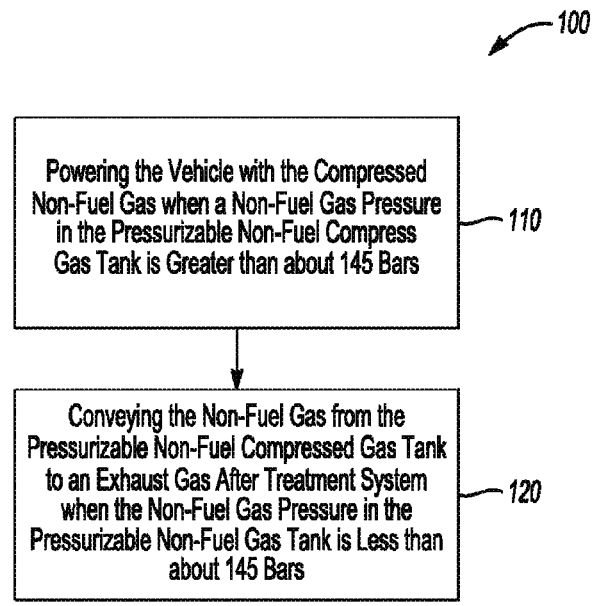
FIG. 7 is a flow chart depicting a method of operating the dual mode heat engine powered vehicle shown in FIG. 3.

FIG. 7 is a flowchart depicting a method 100 of operating the dual mode heat engine powered vehicle 10" as shown in FIG. 3. At reference numeral 110, the method 100 includes powering the vehicle 10" with the compressed non-fuel gas 62 when a non-fuel gas pressure in the pressurizable non-fuel compressed gas tank 24' is greater than about 145 Bars. At reference numeral 120, the method 100 includes conveying the non-fuel gas 62 from the pressurizable non-fuel compressed gas tank 24' to an exhaust gas aftertreatment system 57 when the a non-fuel gas pressure in the pressurizable non-fuel compressed gas tank 24' is less than about 145 Bars. In an example, the conveying the non-fuel gas 62 from the pressurizable non-fuel compressed gas tank 24' depicted at reference numeral 120 may include conveying oxygen gas to the exhaust gas aftertreatment system 57 as a reactant for selective catalytic reduction of oxides of nitrogen. The oxygen gas may be a constituent of a mixture of gasses. For example, oxygen is a constituent of air. In another example, the conveying the non-fuel gas 62 from the pressurizable non-fuel compressed gas tank 24' depicted at reference numeral 120 may include conveying air to the exhaust gas aftertreatment system 57 to react the air with unburned hydrocarbon to heat a catalyst to a light-off temperature, or for soot regeneration for a particulate filter. In yet another example, the conveying the non-fuel gas 62 from the pressurizable non-fuel compressed gas tank 24' depicted at reference numeral 120 may include conveying air to the exhaust gas aftertreatment system 57 to cool a catalyst when the dual mode heat engine is operated at a predetermined percentage of a maximum power of the dual mode heat engine.

There are many uses for the non-fuel gas 62 from the pressurizable non-fuel compressed gas tank 24'. For example, the non-fuel gas 62 may be used to cool underhood, or underbody components, to operate pneumatic actuators, or to supplement normally aspirated or boosted intake air to the ICE 70.

Figure 8:
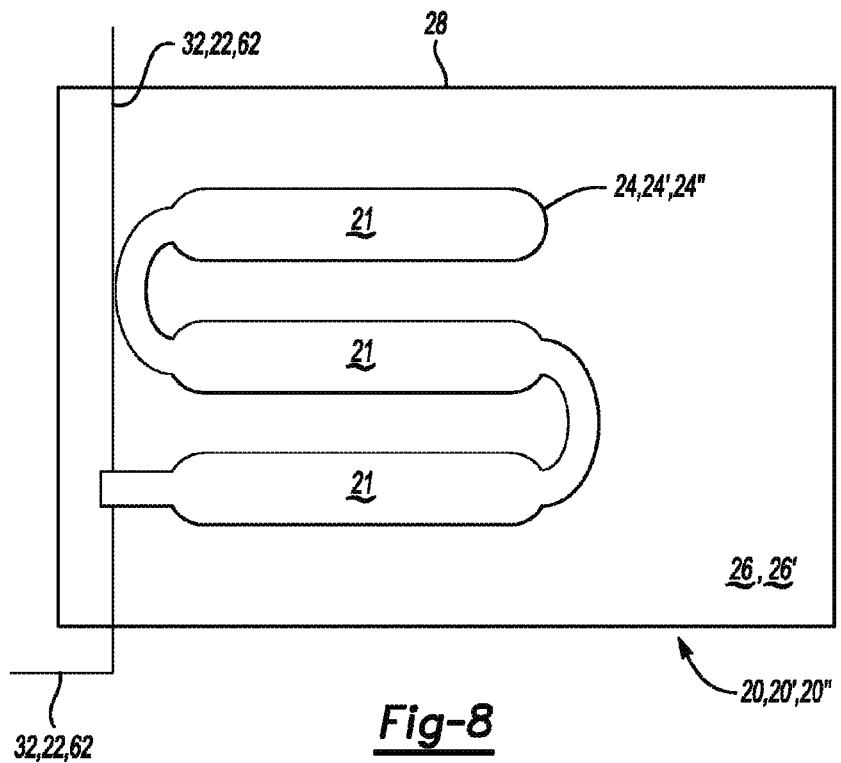
FIG. 8 is a semi-schematic drawing depicting a two-state tank with a liquid fuel tank and a pressurizable compressed gas tank enclosed by the liquid fuel tank, with the pressurizable compressed gas tank having a plurality of tank subunits in fluid communication with each other according to an example of the present disclosure.

FIG. 8 is a semi-schematic drawing depicting a pressurizable compressed gas tank according to the present disclosure. The pressurizable compressed gas tank 24", pressurizable non-fuel compressed gas tank 24', and pressurizable gas-phase fuel tank 24, fit in the interior space defined by the shell 28. The shell 28 may have irregular surface contours to fit in the vehicle 10, 10', 10", 10'''. For example, the dual fuel tank 20, 20', two-state tank 20" may occupy an underbody location typically occupied by a gasoline tank for a vehicle. In order to increase the capacity of the pressurizable compressed gas tank 24", pressurizable non-fuel compressed gas tank 24', and pressurizable gas-phase fuel tank 24, the tank 24, 24', 24" may be a conformable tank. Conformable tanks may have irregular contours, however, in a pressure vessel, irregular contours may reduce the strength, and thereby the capacity of the tank 24, 24', 24". As depicted in FIG. 8, the tank 24, 24', 24", may be a plurality of tank sub-units 21 in fluid communication with each other. The tank 24, 24', 24" may also be a single tank sub-unit 21.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 2 bar to about 50 bar should be interpreted to include not only the explicitly recited limits of from about 2 bar to about 50 bar, but also to include individual values, such as 5 bar, 10 bar, 15 bar, etc., and sub-ranges, such as from about 10 bar to about 18 bar; from about 15 bar to about 19.5 bar, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A dual mode heat engine powered vehicle, comprising:
   a dual mode heat engine having an internal combustion operational mode to provide motive power to the vehicle by combustion of a liquid fuel, the dual mode heat engine having a non-combustion compressed gas expansion mode wherein the dual mode heat engine provides power to the vehicle by non-combustion expansion of a compressed non-fuel gas; and
   a two-state tank, including:
      a liquid fuel tank to receive liquid fuel, contain the liquid fuel, and supply the liquid fuel for combustion in the dual mode heat engine;
      a pressurizable non-fuel compressed gas tank defined by a wall wherein the pressurizable non-fuel compressed gas tank is to receive a compressed non-fuel gas, contain the compressed non-fuel gas, and supply the compressed non-fuel gas for powering the dual mode heat engine in the non-combustion compressed gas expansion mode; and
      a shell enveloping the pressurizable non-fuel compressed gas tank and defining an interior space of the liquid fuel tank wherein:
         the wall is in fluid communication with the interior space; and
         the interior space is to contain the pressurizable non-fuel compressed gas tank.

2. The dual mode heat engine powered vehicle as defined in claim 1 wherein:
   the liquid fuel tank is a pressurizable liquid fuel tank;
   the two-state tank further includes a pressure regulator to pressurize the interior space of the pressurizable liquid fuel tank to a liquid fuel delivery pressure with the compressed non-fuel gas from the pressurizable non-fuel compressed gas tank; and
   the compressed non-fuel gas in the interior space of the liquid fuel tank is to propel the liquid fuel to the dual mode heat engine for combustion.

3. The dual mode heat engine powered vehicle as defined in claim 1, further comprising:
   a liquid refueling port in fluid communication with the liquid fuel tank to selectably interface with a liquid refueling nozzle to receive the liquid fuel from the liquid refueling nozzle;
   a compressed non-fuel gas refilling port in fluid communication with the pressurizable non-fuel compressed gas tank to selectably interface with a compressed non-fuel gas refilling nozzle to receive the compressed non-fuel gas from the compressed non-fuel gas refilling nozzle;
   a compressed non-fuel gas supply tube to convey the compressed non-fuel gas from the pressurizable non-fuel compressed gas tank to the dual mode heat engine; and
   a liquid fuel supply tube to convey the liquid fuel from the liquid fuel tank to the dual mode heat engine.

4. The dual mode heat engine powered vehicle as defined in claim 1 wherein the liquid fuel includes a petroleum liquid fuel, a biodiesel, an alcohol, or combinations thereof.

5. The dual mode heat engine powered vehicle as defined in claim 1 wherein the compressed non-fuel gas is compressed air or compressed nitrogen.

6. The dual mode heat engine powered vehicle as defined in claim 2 wherein:
   the dual mode heat engine powered vehicle has a liquid refueling mode;
   a liquid discriminating vent valve is to selectably vent an ullage portion of the interior space of the liquid fuel tank to a vapor recovery system when the dual mode heat engine powered vehicle is in the liquid refueling mode; and
   a cut-off valve is in fluid communication with the pressurizable non-fuel compressed gas tank and the pressure regulator to selectably prevent the compressed non-fuel gas from flowing out of the pressurizable non-fuel compressed gas tank into the interior space of the liquid fuel tank when the dual mode heat engine powered vehicle is in the liquid refueling mode.

7. A two-state tank for a heat engine powered vehicle, the two-state tank comprising:
   a liquid fuel tank to receive liquid fuel, contain the liquid fuel, and supply the liquid fuel for combustion in the heat engine;
   a pressurizable compressed gas tank defined by a wall wherein the pressurizable compressed gas tank is to receive a compressed gas, contain the compressed gas, and supply the compressed gas for powering the heat engine; and
   a shell enveloping the pressurizable compressed gas tank and defining an interior space of the liquid fuel tank wherein: the wall is in fluid communication with the interior space; and the interior space is to contain the pressurizable compressed gas tank;
   wherein the liquid fuel tank is a pressurizable liquid fuel tank; the two-state tank further includes a pressure regulator to pressurize the interior space of the pressurizable liquid fuel tank to a liquid fuel delivery pressure with the compressed gas from the pressurizable compressed gas tank; and the compressed gas in the interior space of the pressurizable liquid fuel tank is to propel the liquid fuel to the heat engine for combustion.

8. The two-state tank as defined in claim 7 wherein:
   the two-state tank has a liquid refueling mode;
   a liquid discriminating vent valve is to selectably vent an ullage portion of the interior space of the pressurizable liquid fuel tank to a vapor recovery system when the two-state tank is in the liquid refueling mode; and
   a cut-off valve is in fluid communication with the pressurizable compressed gas tank and the pressure regulator to selectably prevent the compressed gas from flowing out of the pressurizable compressed gas tank into the interior space of the pressurizable liquid fuel tank when the two-state tank is in the liquid refueling mode.

9. The two-state tank as defined in claim 7 wherein:
the heat engine is an Internal Combustion Engine (ICE) to provide motive power to the vehicle by combustion of the liquid fuel and a gas-phase fuel;
the gas-phase fuel is the compressed gas for powering the heat engine;
the two-state tank further includes a compressed non-fuel gas port in fluid communication with the pressurizable compressed gas tank to selectably interface with a compressed non-fuel gas source to receive a compressed non-fuel gas from the compressed non-fuel gas source; and
the compressed non-fuel gas is to be the compressed gas to pressurize the interior space of the pressurizable liquid fuel tank to the liquid fuel delivery pressure when the ICE is to be powered by the liquid fuel.

10. The two-state tank as defined in claim 7 wherein:
the liquid fuel tank is to receive the liquid fuel from a liquid refueling nozzle via a liquid refueling port in fluid communication with the liquid fuel tank;
the pressurizable compressed gas tank is to receive the compressed gas from a compressed gas refilling nozzle via a compressed gas refilling port in fluid communication with the pressurizable compressed gas tank;
a compressed gas outlet port is to convey the compressed gas from the pressurizable compressed gas tank to a compressed gas supply tube for conveying the compressed gas to the heat engine; and
a liquid fuel outlet port to convey the liquid fuel from the liquid fuel tank to a liquid fuel supply tube for conveying the liquid fuel to the heat engine for combustion.

11. The two-state tank as defined in claim 7 wherein the heat engine has an internal combustion operational mode to provide motive power to the vehicle by combustion of a liquid fuel, the heat engine having a non-combustion compressed gas expansion mode wherein the heat engine provides power to the vehicle by non-combustion expansion of the compressed gas, wherein the compressed gas is a compressed non-fuel gas.

12. The two-state tank as defined in claim 7 wherein the heat engine has an internal combustion operational mode to provide motive power to the vehicle by combustion of a liquid fuel, the heat engine having a non-combustion compressed gas expansion mode wherein the heat engine provides motive power to the vehicle by non-combustion expansion of the compressed gas for initiating movement of the vehicle from a stand-still and continuing to provide motive power up to a predetermined time or distance threshold, wherein the compressed gas is a compressed non-fuel gas.

13. A method of operating the dual mode heat engine powered vehicle as defined in claim 1, comprising:
powering the vehicle with the compressed non-fuel gas when a non-fuel gas pressure in the pressurizable non-fuel compressed gas tank is greater than about 145 Bars; and
conveying the non-fuel gas from the pressurizable non-fuel compressed gas tank to an exhaust gas aftertreatment system when the non-fuel gas pressure in the pressurizable non-fuel compressed gas tank is less than about 145 Bars.

14. The method of operating the dual mode heat engine powered vehicle as defined in claim 13 wherein the conveying the non-fuel gas from the pressurizable non-fuel compressed gas tank includes conveying oxygen gas to the exhaust gas aftertreatment system as a reactant for selective catalytic reduction.

15. The method of operating the dual mode heat engine powered vehicle as defined in claim 13 wherein the conveying the non-fuel gas from the pressurizable non-fuel compressed gas tank includes conveying air to the exhaust gas aftertreatment system to react the air with unburned hydrocarbon to heat a catalyst to a light-off temperature.

16. The method of operating the dual mode heat engine powered vehicle as defined in claim 13 wherein the conveying the non-fuel gas from the pressurizable non-fuel compressed gas tank includes conveying air to the exhaust gas aftertreatment system to cool a catalyst when the dual mode heat engine is operated at a predetermined percentage of a maximum power of the dual mode heat engine.

17. The method of operating the dual mode heat engine powered vehicle as defined in claim 13 wherein the conveying the non-fuel gas from the pressurizable non-fuel compressed gas tank includes conveying air to the exhaust gas aftertreatment system to react with soot in a particulate filter to regenerate the particulate filter.

* * * * *